United States Patent [19]
Sibbitt et al.

[11] Patent Number: 5,065,393
[45] Date of Patent: Nov. 12, 1991

[54] NETWORK CONTROLLER BILLING SYSTEM AND METHOD OF OPERATION

[75] Inventors: Marcille Sibbitt, Kensington, Calif.; Dowell Stackpole, Springtown, Tex.

[73] Assignee: DSC Communications Corporation, Plano, Tex.

[21] Appl. No.: 507,363

[22] Filed: Apr. 10, 1990

[51] Int. Cl.⁵ .................... H04Q 11/00; H04M 3/22
[52] U.S. Cl. .................. 370/58.2; 370/58.1; 370/62; 379/13; 379/54; 379/92; 379/112; 379/114; 358/84; 340/825.03; 340/825.06
[58] Field of Search .............. 370/53, 58.1, 58.2, 370/58.3, 60, 60.1, 62, 66, 67, 68.1, 77, 79, 85.1, 110.1, 118, 54; 379/1, 9, 10, 12, 13, 14, 15, 16, 17, 53, 54, 92, 93, 94, 96, 112, 114, 120, 133, 202, 242, 243, 258, 268, 269; 340/825.03, 826, 825.06, 825.15; 358/84, 85

[56] References Cited

U.S. PATENT DOCUMENTS

| | | | |
|---|---|---|---|
| 4,529,840 | 7/1985 | Colton et al. | 379/54 |
| 4,694,452 | 9/1987 | Beckinger et al. | 370/58.2 |
| 4,771,419 | 9/1988 | Graves et al. | 370/58.3 |
| 4,839,916 | 6/1989 | Fields et al. | 379/13 |
| 4,887,076 | 12/1989 | Kent et al. | 370/58.1 |

Primary Examiner—Douglas W. Olms
Assistant Examiner—Alpus H. Hsu
Attorney, Agent, or Firm—Baker & Botts

[57] ABSTRACT

There is disclosed a system and method for controlling the cross connect field of a multi-locational switched network from a single location under control of instructions from the end users. The different crossconnect fields of the entire switched network are controlled in response to instructions received by the controller from each end user. The instructions specify the period of time when the end user desires to establish certain connections through the network and also specify the bandwidth required during that period of time. The controller preassigns certain channels of the internetwork links and at the designated time period the connections are established. The system is designed to provide cost accounting and auditing information pertaining to the reserved time for each end user on a link by link basis as well as for the time during which the links were actually used for communication.

32 Claims, 7 Drawing Sheets

CURRENT STATUS STATE DIAGRAM
1060

FIG. 10

ORIGINAL REQUEST DATA

| SCHEDULE ID 1002 | CIRCUIT ID 1003 | BANDWIDTH FACILITY CHANNELS 1004 | REQUEST DATE/TIME 1005 | START DATE/TIME 1006 | END DATE/TIME 1007 | CURRENT STATUS 1008 |
|---|---|---|---|---|---|---|
| 73 | ABC | M01_OFF 1-3<br>M11_J13 7-9<br>J06_OFF 18-20 | 01-MAR-1990 13:45 | 21-JUN-1990 11:00 | 23-JUN-1990 11:00 | PENDING  1009 |
| 80 | XYZ | F7_OFF 7<br>F9_G01 24<br>G16_M17 21<br>M12_OFF 1 | 12-MAR-1990 12:00 | 13-MAR-1990 00:00 | 13-MAR-1991 00:00 | ACTIVE  1010 |
| 113 | CKT01 | M01_OFF 6<br>M43_F72 7<br>F81_OFF 9 | 03-NOV-1989 06:45 | 01-JAN-1990 12:00 | 01-JUN-1990 13:00 | CANCELLED ←1011<br>CANCEL DATE/TIME<br>06-DEC-1989 16:00 |
| 62 | ABC | M01_OFF 1-3<br>M14_G05 1-3<br>G63_J72 22-24<br>J06_OFF 18-20 | 01-DEC-1989 00:00 | 06-DEC-1989 00:00 | 16-DEC-1990 00:00 | CANCELLED ←1011<br>CANCEL DATE/TIME<br>10-DEC-1990 16:00 |
| 111 | LA_SF | S14_OFF 1-24<br>S21_L72 1-24<br>L66_OFF 1-24 | 01-DEC-1989 00:00 | 01-JAN1990 11:00 | 01-FEB-1990 07:00 | EXPIRED  1013 | ns
NETWORK CONTROLLER BILLING SYSTEM AND METHOD OF OPERATION

TECHNICAL FIELD OF THE INVENTION

This invention relates to cross-connect networks and more particularly to such networks in which end users can, for periods of time, schedule network capacity over pooled inter-network facilities, and wherein the billing reflects the customer actual and scheduled usage.

CROSS REFERENCE TO RELATED APPLICATION

U.S. patent application Ser. No. 507,594, entitled "Network Controller Scheduling System and Method of Operation", filed concurrently herewith.

BACKGROUND OF THE INVENTION

There exists today massive national and international communication switch networks whereby an end user connected to one node can communicate to an end user, or to a particular internodal facility. These nodes or frames can be in the same office, across town, across a continent, around the world, and perhaps even in space.

These networks are constructed having at least one rearrangeable cross-connect field at each node. The cross-connect field operates under control of instructions from a network controller and serves to interconnect a plurality of end users to the internetwork communication links. The interconnections through the cross-connect field are semipermanent in nature and can last for a single communication connection or can last for a period of time which may span several such connections.

End users can be permanently assigned certain link capacity on a cross-connect field or can share the capacity with other users of the same cross-connect field. This shared usage is called pooling. It is now common place for any one user to have facilities permanently assigned and to have additional periodic facility capacity by using the shared facility pool.

Within each internetwork link there are channels which can be used to establish communication connections. For certain types of communications more than one channel is necessary in order to establish the desired bandwidth capability. Usually, these channels must be contiguous in order to create the necessary bandwidth for a given communication connection. There are several such facilities interconnecting each network node and from any particular end user to any remote end user (or other communication facility, such as a computer) there could be many different links or paths. Thus, for a connection from one end user at a given node to another end user at a different network node there would be a choice of routes that could be established. Some of these routes are more cost effective than others. Presently, when an end user who has access to a shared pool of facilities wishes to become connected to the pool, an attendant must communicate with the network manager and request the establishment of the proper connection. The network manager then assigns the proper routing (including the facilities and channels) to the end user for a particular period of time and establishes the connections required to affect the end to end circuit.

This arrangement is both time consuming and very inefficient from an attendant's point of view. In some situations, the use of pooled internodal facilities for short periods of time is not practical if an attendant must become involved. This is so for many reasons, one of which is the fact that often the desired use of the pooled facilities is for a short duration for the purpose of data transfer, which usually is scheduled to occur after normal hours and at other inconvenient times. Also, since a network serves many such end users, and since each end user has a number of different connection requests, the delay in central administration can become prohibitive.

In any such system, billing becomes a major concern. Each customer, or user, of the system desires to be billed for the actual time they are using the network. The users, however, have scheduled time through the network and in order to achieve the lowest possible costs, it is to their advantage to schedule this time early so that the best (in terms of cost) routes are available and not booked by some other customer.

This situation, then, could lead to a practice that would make it advantageous for users to book prospective time early to assure availability and then, at the last minute, cancel the reservation if the time were not actually going to be utilized by the user. This would result in lost revenue to the network provider as well as inconvenience to other users who could not schedule their time for the lowest cost routing.

Thus, a need exists in the art for a system in which a controller central to a plurality of network nodes can establish, on a timed basis, cross-connections at the various nodes so that users sharing the internetwork facilities can have bandwidth established between any end points of the network for periods of time under control of the users and in which billing can be printed dependent upon usage and scheduled usage.

A further need exists in the art for such a system which allows each end user sharing a common pooled set of communication facilities to schedule a series of timed connections through the entire network, from end point to end point, with each connection routing occurring at a particular given time. Such a system must also have the capability of determining the least cost prospective routing, verifying that the user in fact has allowance for using the requested facilities, for establishing the routing only for the proper period of time, and of supplying an audit trail for billing purposes.

SUMMARY OF THE INVENTION

These objectives, as well as others, have been achieved by a system and method of operation in which a multi-location switched network is established with a central controller which has access to all of the links of the system for the purpose of determining the busy-idle status of the links and for the purpose of monitoring the well-being of the links. Using this system, an end user at any node can log into the controller and can send instructions as to the bandwidth desired between nodes and the exact time that such bandwidth will be required.

In response to this information, the controller first determines that the end user in fact has authorization to use the requested bandwidth during the time of the requested period. Assuming this to be the case, the controller looks for channels of the communication facilities between the end points requested which will be idle during the prospective time period. There may be several combinations of routings that could be scheduled and the controller, using a least cost algorithm, selects the most favorable path. Once the path is identified, then available bandwidth through the path must be selected and reserved. Once this is accomplished, the prospective routing is scheduled for use by the initiating end user during the requested time period.

At the scheduled period of time or slightly therebefore, the controller begins an assessment of the continued viability of the previously selected channels to insure that quality communications will be possible during the scheduled period. Connections are then made through the various nodes at the proper time to insure that the end user has the requested bandwidth capability between the selected end point locations. A connection record is maintained giving the network manager billing information pertaining to the established time of the connection through the node as well as the time at which the reservation was made. In this manner, the user can be billed one rate for permission to use the pooled facilities, a second rate for the amount of time the facilities are reserved and a third rate for the time the facilities could have been used for actual communication by the end user.

In actual practice, the preassigned channels can be periodically reviewed to insure that the facilities are packed efficiently and that contiguous channels are used when necessary. This problem arises, for example, when a 24 channel facility is used and when an end user requires less than all of the channels. Other end users may be assigned some of the channels, depending upon their requirements. However, since reservations may change between the initial request from any end user until the actual time of usage, the channel allocation for a particular end user might change. The system accommodates this dynamic situation and changes the preassignment accordingly.

A least cost algorithm is used in the first instance to establish the proper routing for a prospective end user, and the channel assignments are based on this calculation. Changes, due to new requirements for channels, or due to transmission problems with the selected channels, can be accommodated.

A billing system is established to track the scheduled time for all facilities and to provide billing dependent upon the scheduled time and upon the actual time used. The user can then be billed by the network manager for the number of days, or hour that the facilities are reserved before the actual usage. In this way, there will be less temptation for a user to book blocks of time and then release the time prior to use. This arrangement preserves the prescheduling feature for those who have definite use requirements while encouraging capacity to remain available when not actually required.

Accordingly, it is a technical advantage of this invention to provide a scheduling and reservation system for a network of cross-connect fields, each field located at a node in a switched communication network and to provide billing information based on reserved time.

It is a further technical advantage of this invention to provide a controller for controlling connections through one or more cross-connect frames or nodes, with at least one of the frames or nodes serving a plurality of different customers, and with the frames or nodes having a plurality of links for interconnecting the frames or nodes with another cross-connect network, the cross-connect frames or nodes each operable for establishing connections under control of the controller for periods of time where the controller receives instructions from any of the customers and keeps track of the present and the future status of the internodal facilities and reserves certain of the internodal facilities for fixed determined periods of time, and then establishes through the cross-connect network, connections in accordance with the reserved facilities at the designated period of time. Billing information is provided based on the reserved time of the facilities.

BRIEF DESCRIPTION OF THE DRAWINGS

The foregoing objects, features and technical advantages, as well as others, of the invention will be more apparent from the following description of the drawings in which:

FIGS. 10-12 show scheduling and data base entries.

DETAILED DESCRIPTION OF THE INVENTION

Figure 1:
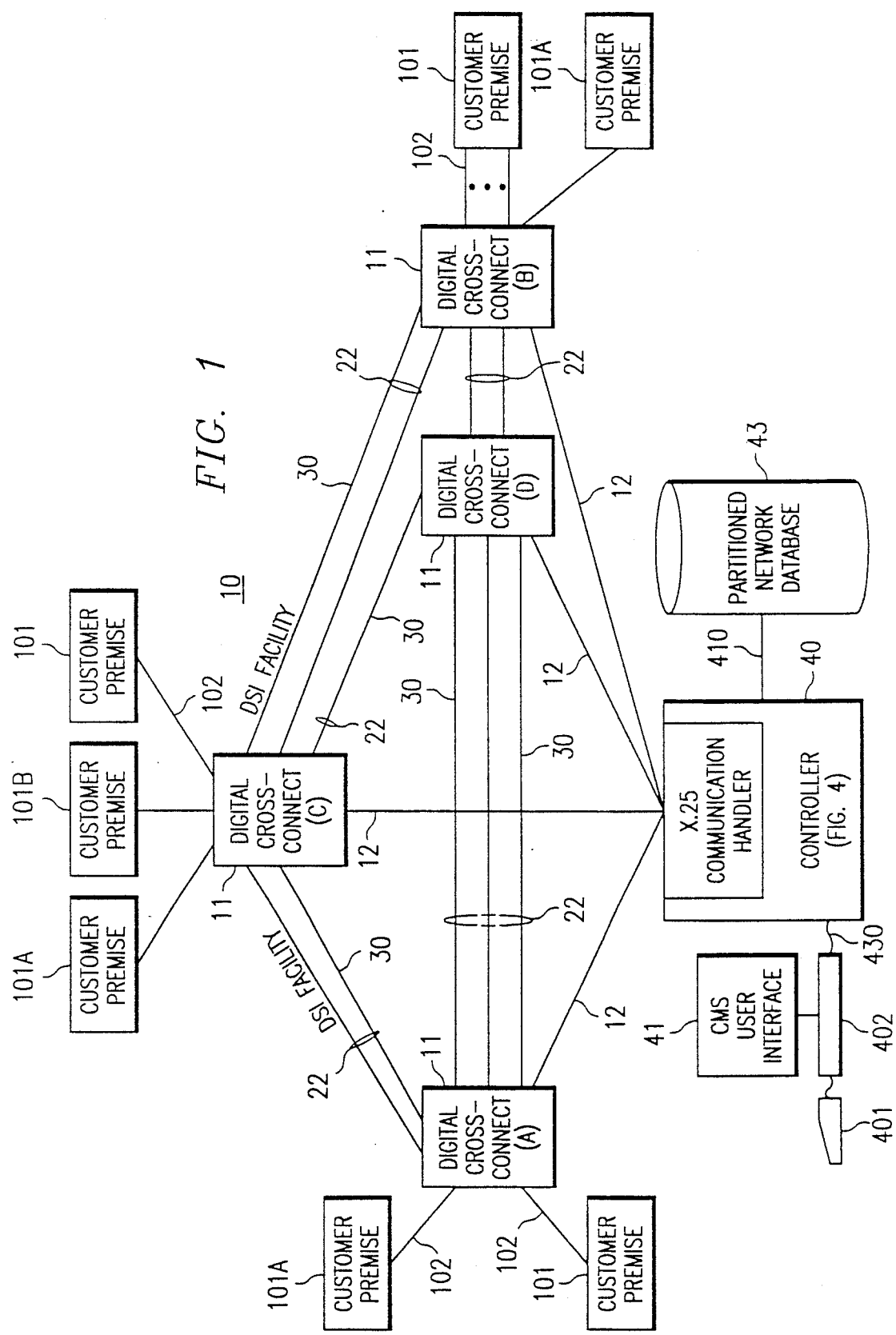
FIG. 1 is a block diagram of a cross-connect network showing the interaction with a schedule controller.

FIG. 1 is a block diagram of a cross-connect network 10 showing communication links 12 to controller 40 being able to communicate with each cross-connect 11 in the network. Controller 40 is the network controller which actually contains the software which allows user 41 to log into the system, provides communication links to each cross-connect in the network, and schedules connections and disconnections within the network. Controller 40 also has the routing ability to do routing from one customer premise location to another. The controller defines schedule conflicts in the network such that if a customer desires to set up a connection from one customer premise to another, the controller will determine what facilities 30 are going to be available during that time period and then stores the scheduled facilities in the data base. When the time comes to set up that connection, the controller will wake up, send the commands via connection 12 to the individual cross-connects 11 so that they will make the connections and effect the end-to-end circuit from one customer premise to another.

FIG. 1 shows network 10 which is comprised of a number of cross-connects 11. The cross-connects are connected by DS1 facilities 30. The DS1 facilities that connect to individual cross-connects 11 are pooled into links 22 so all the facilities between two cross-connects comprise links 22. Also shown are customer premise locations 101 which will connect to cross-connects 11 via lines 102. It should be noted that at any digital cross-connect 11 there can be any number of different customers 101, 101A, 101B connected via individual lines 102. Note also that the lines can be trunks or any other type of communication facility, digital or analog, and that line 102 represents a communication connection between customer premise 101 and cross-connect 11.

As a practical matter, line 102 would be divided into various sections and could in fact include the public switched network or a private network, and can, and most likely could, be digital with conversion to analog at some point. Of course, line 102 could be digital all the way through to the customer premise equipment. This equipment typically would be telephones, fax machines, or computers. Also, while a single line 102 is shown, these can be multiple lines.

Cross-connect 11 is a frame or a node in network 10 and can be a digital cross-connect node, as, for example, DSC DEXCS 1 or DSC DEXCS 1L. User interface 41 is the terminal that a customer would use to log in to controller 40. Interface 41 can be a VT 220 user terminal or it could be a PC workstation. Keypad 401 is the keyboard portion of the user interface terminal. System 402 is the controller of a PC used to interface with controller 40 via ethernet cable 430. This connection, of course, can be a dial-up type of connection into controller 40. Disk 43 contains the actual data description of the network controlled by controller 40 and is connected to the controller via interface 410.

Figure 2:
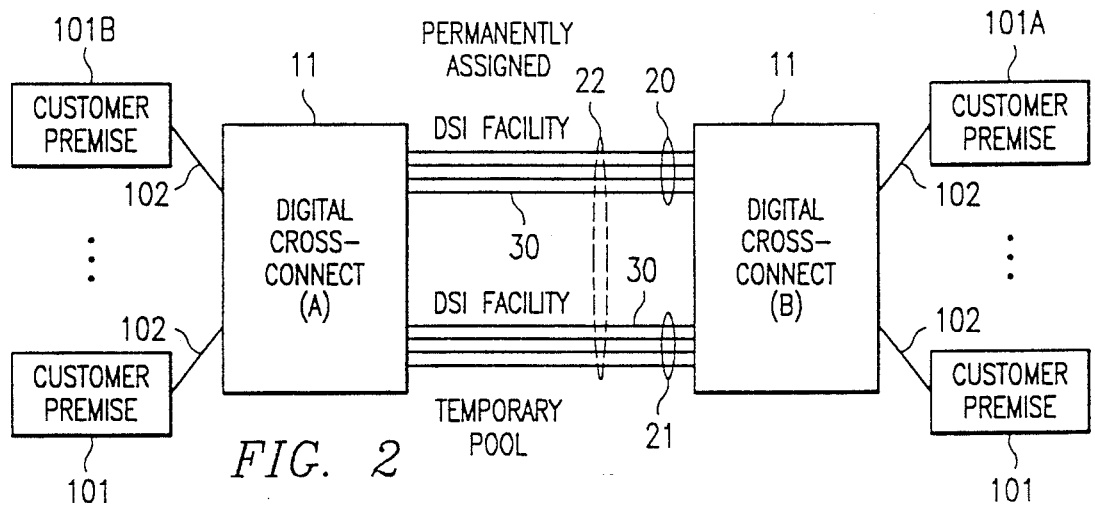
FIG. 2 shows details of the interconnect facility between cross-connect fields.

FIG. 2 is a blowup of a portion of FIG. 1 showing two digital cross-connects 11(A) and (B) connected by several DS1 facilities 30. Note that the DS1 facility 30 can be grouped into pools 20 and 21 where pool 20 is designated as part of the permanent pool while pool 21 is defined as belonging to the temporary pool. Pool 20 is available for permanent assignment to customers and pool 21 is available on a first-come first-serve basis to customers when they want to reserve capacity in the network. Link 22 is representative of the logical link between two digital cross-connects 11 where link 22 is defined as the total number of DS1 facilities 30 connecting two digital cross-connects.

Also connected to the digital cross-connects are a number of customer premise locations 101, 101A, 101B connected to the digital cross-connects via lines 102 where the lines 102 can be cross-connected to the DS1 facilities 30 within the digital cross-connect 11. In typical operation, customer premise 101 would have the same customer end-user at different nodes 11 as shown with respect to nodes A and B. Thus, as shown in FIG. 2, the same customer 101 is at both nodes 11 while customer 101B appears at one end of the nodes and 101A is a different customer end-user and appears at a different node. Typically, the system is designed so that the same customer appearing at different nodes can interconnect only between that customer and not with other customers.

Figure 3:
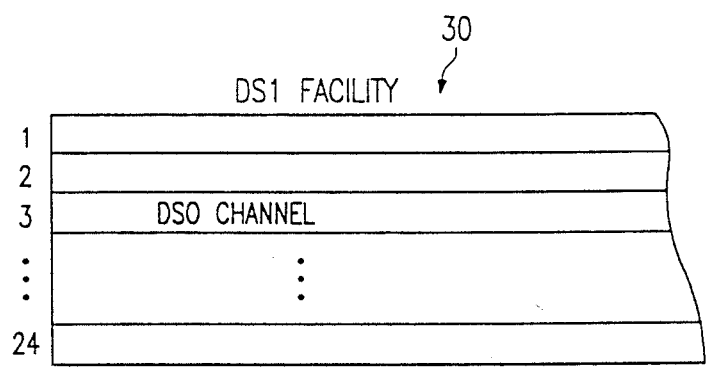
FIG. 3 shows the channels in a DS1 facility.

FIG. 3 is an expansion of DS1 facility 30 illustrating that a DS1 facility is composed of a number of DS0 channels. Packing of channels is a concept which allocates channels within a facility such that the facilities are not fragmented. For example, if a customer requires 3 channels of bandwidth on a facility, we look at all the facilities on a given link to get the customer from node A to node B. We then choose 3 channels of a given facility that are contiguous. In addition, we also choose the channels so that if a second customer requires channels, the ones already assigned will not be in the middle of a facility with spare capacity on each side. One customer will be given channels 1, 2 and 3. Another customer will be given channels 4, 5 and 6. Note that customer two was not assigned channels 6, 7 and 8 which would leave channels 4 and 5 empty and not available to another customer requiring three channels of contiguous bandwidth. Sometimes because of time differences in when the channels are being used, the facility becomes fragmented. In this situation, if possible, it is advantageous to rearrange the assignments of channels to maintain a packed facility.

In the diagram of FIG. 3 a DS1 facility is shown as being composed of 24 DS0 channels. This could also be generalized so a facility in broad terms contains any number of channels. For example, a DS3 facility would contain $28 \times 24$ DS0 channels.

Figure 4:
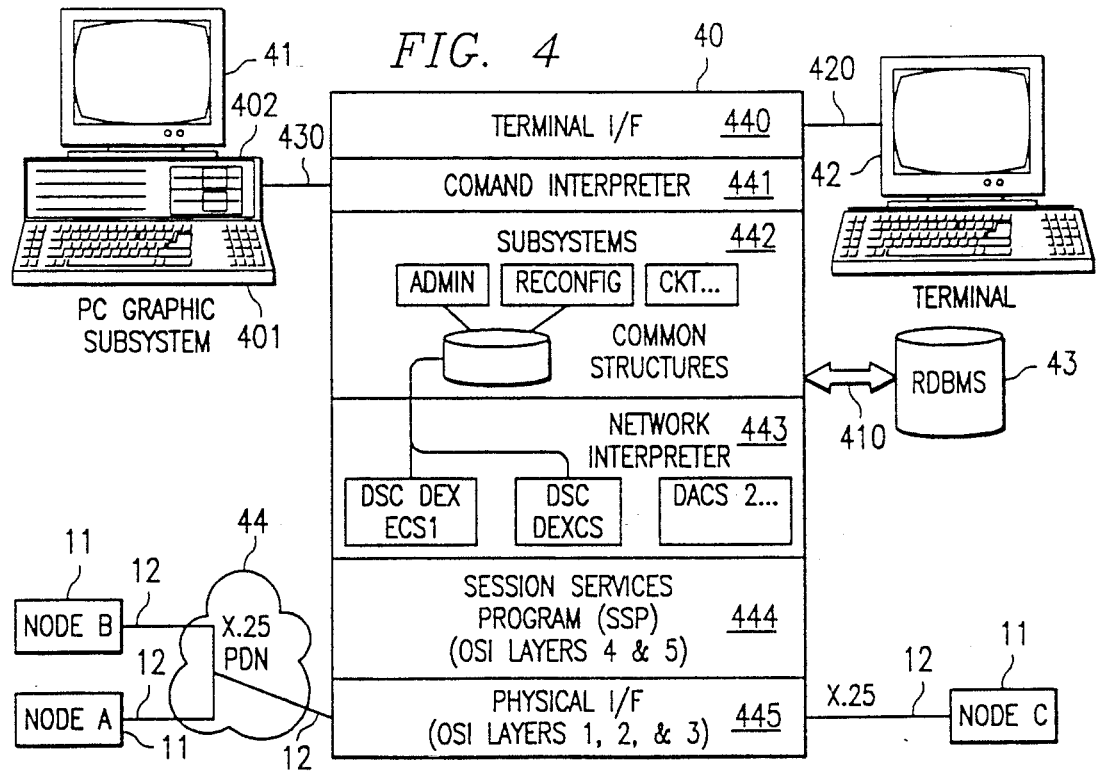
FIG. 4 shows a block diagram of the layers in the control program for setting up and controlling connections through the network.

FIG. 4 is an elaboration of FIG. 1 showing controller 40 connected to nodes A, B and C of cross-connect 11 via communication channels 12, which, for example, can be a x.25 protocol network 44. Channels 12 enter the controller at physical interface layer 445. Physical interface 445 is connected through session services program 444 and then through network interpreter 440 for different types of cross-connects and then to subsystems 442 to communication with the actual application control. Instructions from users 41 enter the system through command interpreter 441 either from a graphic workstation 41, 401, 402 via link 430 or from conventional terminal 42 via link 420 and interface 440. The applications are connected to data base 43 via interface 410.

Figure 5:
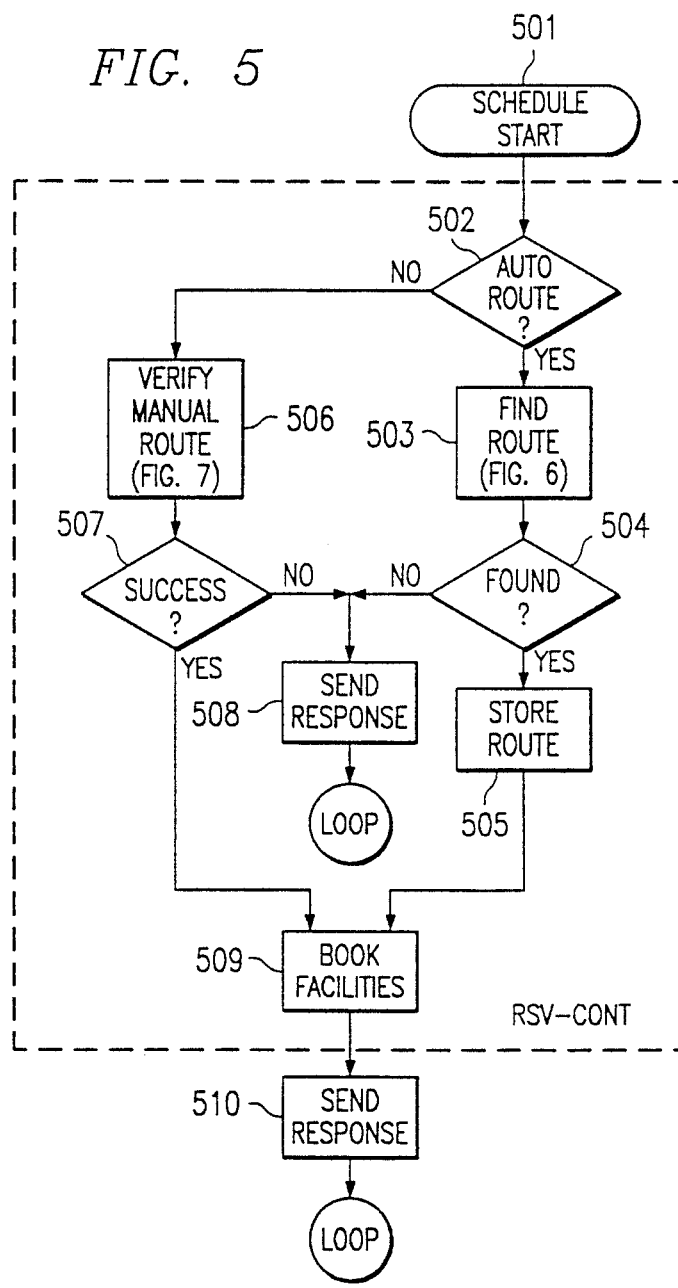
FIGS. 5-9 show subroutines for controlling scheduling in the network.

FIG. 5 describes one algorithm for processing an end user request to schedule a circuit for connection. Starting out at box 501, the system looks at the circuit that the user is requesting to schedule for connection. A determination is made as to box 502 as to whether or not auto routing is required. If the circuit is to be auto routed, meaning the end user has not defined a route for the circuit, then the system proceeds, box 503, to find a route for the circuit. This operation will be described hereinafter with respect to FIG. 6. Assuming now that a route is found and the system proceeds, box 504, to store the route, box 505, in the data base. The system books the facilities, box 509, that are part of the circuit's route. Booking means that the system stores in the data base what facilities (channels) are going to be used, the timeframe they are going to be used, and the circuits with which they are associated. Box 510 then sends an appropriate response to the user.

Assume now that a manual route is to be employed. This is determined by box 502. This means that the end user has manually defined a route to be used for that circuit. That route is verified as controlled by box 506 which will hereinafter be described with respect to FIG. 7. The system must verify that the user defined manual route is going to be available in the designated time period. If the route is available, as shown in box 507, then the system books those facilities via box 509, as discussed above. An appropriate response is returned to the user.

If the facilities are not going to be available, a different response, box 508, is returned to the user indicating that the desired route cannot be scheduled for that time period because some of the facilities are already booked.

Returning again to box 502, when an auto route request is made, there are tables stored in data base 43 (FIG. 1), that provide the definition of the circuit and whether there is a route stored for that circuit. This same data base is used to determine whether the facilities in a manually provided route are available during the designated time period. In general then, there are tables in data base 43 that define what facilities are booked for what periods of time. So by looking in those tables, the system can determine whether the facilities that are part of a circuit's route are available during a time period requested. In operation, the system stores the route information in the data base in a table and defines it as a route for the circuit associated with this schedule. The system also takes the facilities stored in that route and defines them as booked for the time period. In this manner complete control of the system is maintained without regard to where the actual physical facilities are located.

Figure 6:
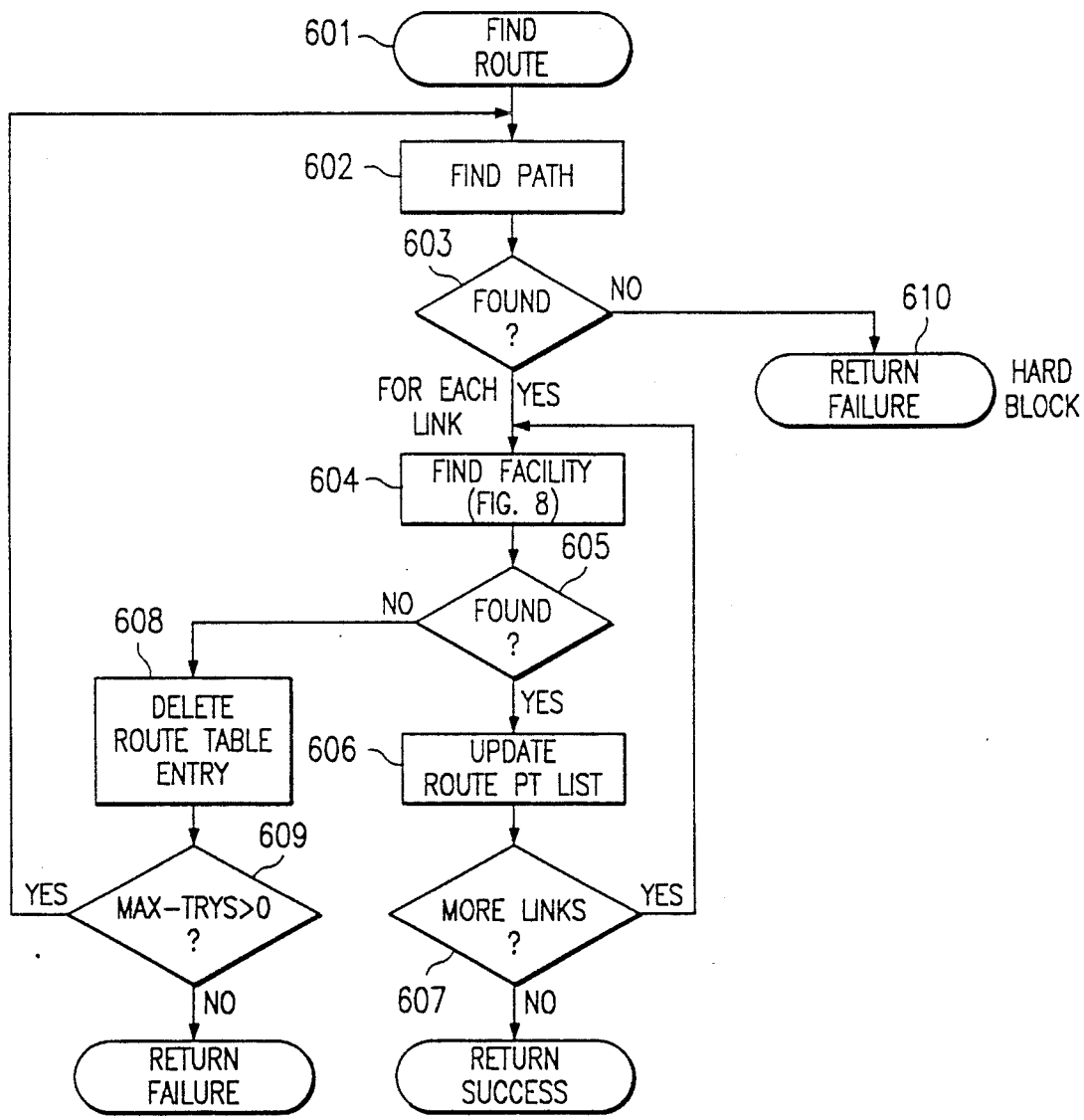

Continuing now in FIG. 6, there is shown the algorithm used by the system for finding a route, box 601 for a circuit. The first step in finding a route is box 602, where the system finds a path, which will be recalled from FIG. 1, is a list of links from one customer premise location to another customer premise location. Find path, box 602, uses an algorithm where it uses "weighting" factors on links and determines the least cost based on the weight factors to get from one end point cross-connect frame to another end point cross-connect frame. If the auto routing algorithm finds a path, box 603, then for each link in that path a facility will be found, box 604. The algorithm for finding a facility will be described with respect to FIG. 8.

If the system finds a facility, then that facility is added to data base 43, as discussed. The system then continues on to the next link. The facility for the next link, if it's found, is also stored in data base 43. The system continues until it gets to a link for which it cannot find an available facility. The system then goes back to data base 43, deletes the route that has been stored and then goes back to box 602. The system then must find another path to get from the first input cross-connect to the end input cross-connect because the first desired set of links is at a particular link. The system selects another path that excludes the blocked link and starts over again. The system continues this iterative loop until it finds a facility for each link of the path which will be available at the proper time. When this occurs, box 606 updates the route to be stored in data base 43. Since all links have been selected, the system is successful.

If on the other hand, the system continues to find unavailable links and exhausts its links, and if it has reached a maximum number of attempts, box 604, it determines that it is hard blocked and returns a failure indication.

Figure 7:
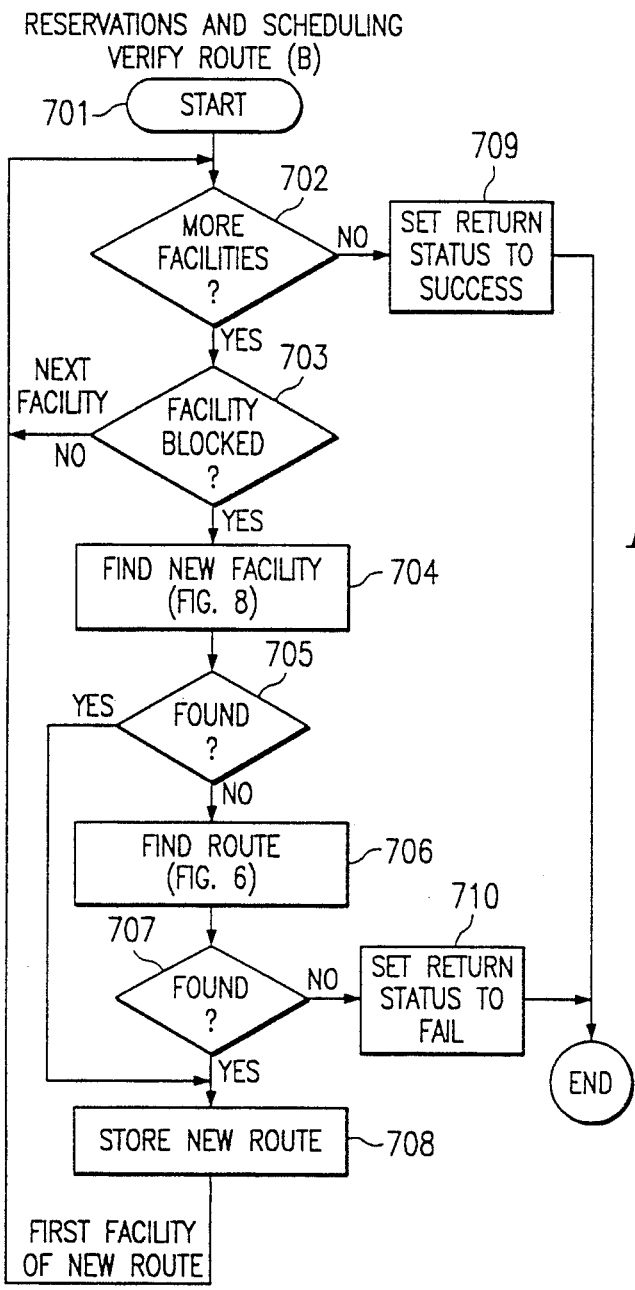

FIG. 7 is the algorithm for verifying the availability of the capacity in a previously defined route. The route was previously stored in data base 43, and the system goes to the data base, pulls out the route that was defined for that circuit, and, for every facility in that circuit's route, goes to box 703 to determine whether the facility is blocked or available. To determine whether a given facility is blocked, the system uses data base 43, as discussed above to see if this facility is available during the desired time period. If the facility is not blocked, the system goes back to the circuit route, obtains the next facility in that circuit's route, and checks whether that next facility is blocked. This is continued until the system is through with all the facilities. If none of the links are blocked, then box 709 returns a success indication that the predefined route is verified to be available during the time period requested.

However, if during this loop when the system is testing the facilities to see whether they are blocked, it encounters a facility that is blocked or unavailable for some reason during the time period requested, then the system goes to box 704 to find a new facility for this link. This operation will be hereinafter described with reference to FIG. 8. Continuing now with box 705, if the system finds a new facility, it updates the route that was stored in data base 43 by substituting the new facility for this link. The system then goes back and starts over at the beginning to verify this new circuit route.

If however, the system is not able to find a new facility, it goes to box 706 and tries to find an auto route for the circuit. If a route is found, the new route is substituted in the list and the verification process begins again via box 706. If, however, this avenue is exhausted, then boxes 707 and 710 control a failure indication to the user.

Figure 8:
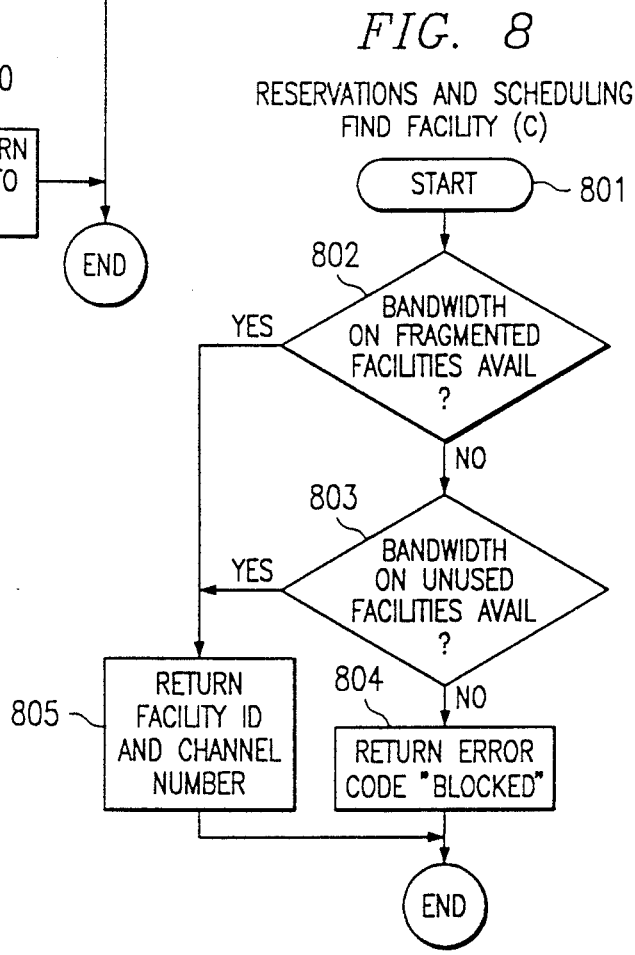

FIG. 8 shows one algorithm, referred to previously, for finding a facility and/or channels on a given link. For a particular link, the system must determine the bandwidth needed and also determines where that bandwidth can be found. The system looks for bandwidth, box 802, on fragmented facilities to see if bandwidth is available on facilities that already have some capacity scheduled. If there is capacity on one of those fragmented facilities, then the system is finished, box 805, and the system returns the facility ID and the channel number.

If, however, the system was unable to find available bandwidth on a fragmented facility, then it will go to data base 43 and search, box 803, for bandwidth on a facility that has no channels booked thereon. If this is found, then this operation is finished and box 805 returns the identity of that facility and channel number. If the system is unable to find bandwidth on an unused facility, then box 804, returns an error.

Figure 9:
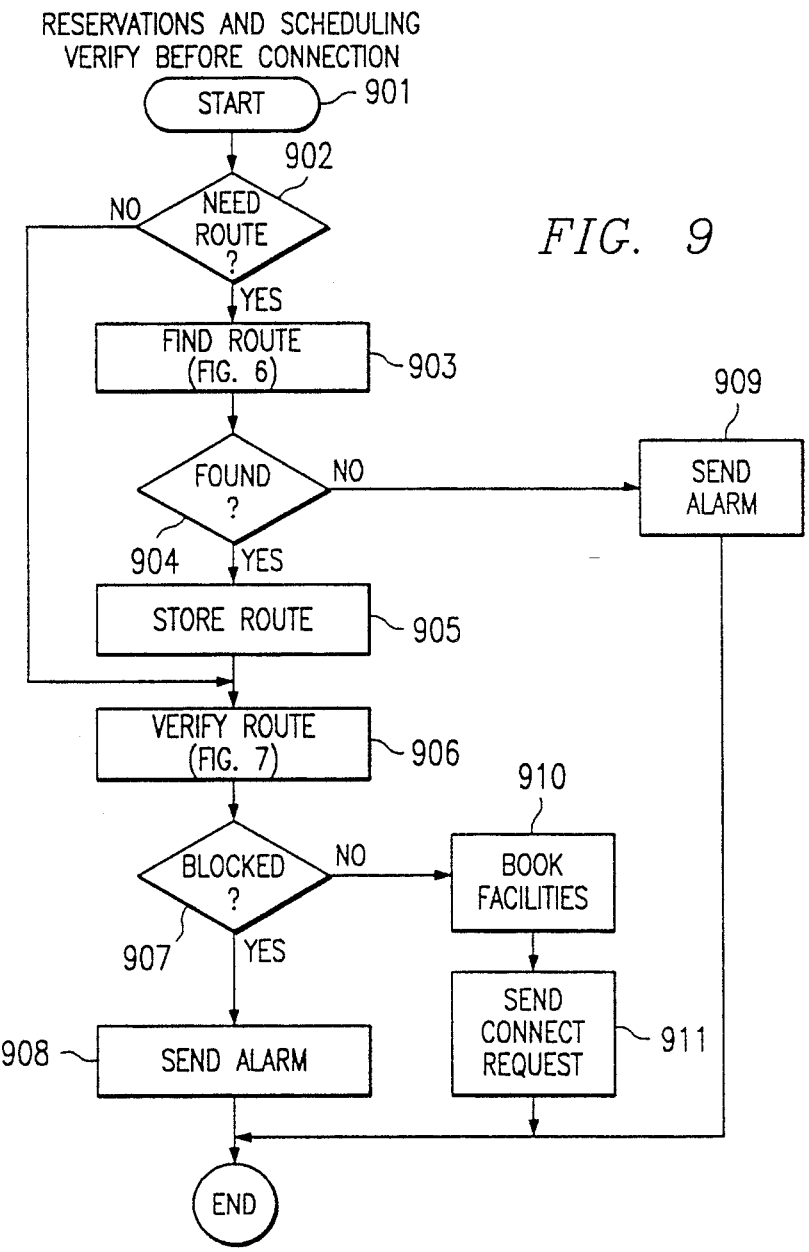

FIG. 9 describes an algorithm used to verify a previously requested schedule request just prior to connection. Before the circuit is ready to be connected, the system verifies that the circuit's route is still available for connection. Starting with box 902, if a circuit that is stored in data base 43 and is scheduled for connection needs a route defined for it, then that route is found by box 903 as previously described with respect to FIG. 6. This could happen, for example, if the system had stored a request that didn's have any route associated therewith because there were none available at the time the circuit was first identified. When the system wakes up and determines that it is time to connect that circuit, it then looks for a route.

Assuming that a route has been stored and box 906 verifies the route, then the system would remove the route information from data base 43 and the system is verified as previously discussed with respect to FIG. 7. One of the inputs to FIG. 7 is whether the system desires to check to see if the facilities will be available in the figure, or whether the system desires to check the dynamic alarm status of the facilities for immediate connection. Thus, in addition to checking that the facilities are not booked by someone else, the system will verify that the facilities are not in an alarm condition or for some other reason unavailable. If the desired routing is not blocked, the system books the facilities and sends a connect request to all of cross-connects to connect up the circuit. If the route is blocked, then the system notifies the users that the desired connection cannot be established.

It should be noted that many degrees of sophistication can be employed in his system. For example, if a circuit is stored for which routes are determined to be unavailable, then the system can be set if desired, to wake up periodically and attempt to assign specific routes. The user administration can be notified when a routing has become available and billing can be measured depending upon the actual connection time, as well as upon the actual time of the prereservation.

FIG. 10 shows a sample of an original request data entry in data base 43. The system provides billing data by 1) storing information about the original schedule request 1001; 2) maintaining a current status of each schedule request 1008; and 3) storing information about the actual connection and disconnection of the circuit associated with the original schedule request 1050 (FIG. 12).

The original request data 1001 includes, for each schedule request, a unique schedule identifier 1002, the circuit identifier of the scheduled circuit 1003, the bandwidth reserved for the schedule request 1004, the date and time the original schedule request was received 1005, the requested starting date and time of the schedule request 1006. The starting time is the time the circuit is to be connected through the switched network. Also included in original request data 1001 is the requested ending date and time of the schedule request 1007. The end date/time is the time the circuit is to be disconnected.

Figure 11:
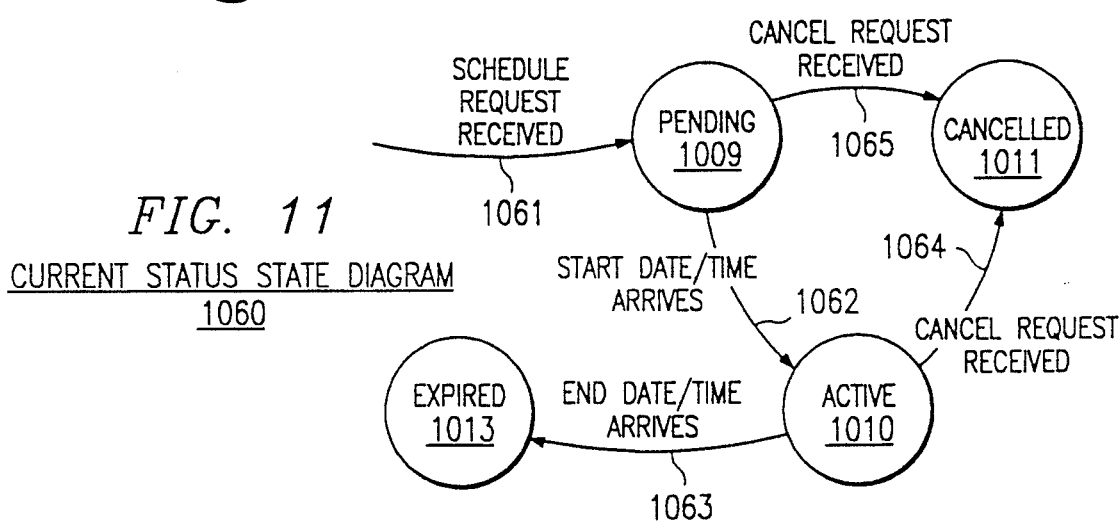

FIG. 11 shows current status state diagram 1060 which defines the valid status values of a schedule request. Current status 1060 of a schedule request may be pending 1009, meaning the start date/time 1006 of the schedule request has not yet been reached, i.e., it is pending connection. Current status 1060 may be active 1010, meaning the start date/time 1006 of the schedule request has arrived and the circuit is connected. Current status 1060 may be expired 1013, meaning the end date/time 1007 of the schedule request has arrived. Current status 1060 may also be cancelled 1011, in which case a cancelled date/time is stored.

FIG. 12 shows one sample of connect data 1050 including, for each schedule request, schedule identifier 1002, the date and time the circuit was actually connected through the switched network 1051 and the date and time the circuit was actually disconnected 1052.

As shown in FIG. 11, when the schedule request received 1061 action occurs, data in original request data 1001 table is recorded. This includes schedule ID 1002, bandwidth 1004, circuit ID 1003, request date/time 1005, start date/time 1006 and end date/time 1007. Current status 1060 of the schedule request is set to pending 1009.

When start date/time arrives 1062 for a schedule request in pending 1009 state, a connect date/time 1051 is recorded in connect data 1050 and current status 1060 of the schedule request is set to active 1010 state.

When a cancel request received 1065 action occurs for a schedule request which is in pending 1009 state, a cancelled date/time 1012 is recorded for the schedule request, and the current status 1060 of the schedule request is set to cancelled 1011 state.

When a cancel request received 1065 action occurs for a schedule request which is in active 1010 state, a cancelled date/time 1012 is recorded for the schedule request, a disconnect date/time 1052 is recorded in connect data 1050 and current status 1060 of the schedule request is set to cancelled 1011 state.

When an end date/time arrives 1063 action occurs for a schedule request which is in active 1010 state, a disconnect date/time 1052 is recorded in connect data 1050 and the current status 1060 of the schedule request is set to expired 1013 state.

Although the present invention has been described with respect to a specific preferred embodiment thereof, various changes and modifications may be suggested by one skilled in the art, and it is intended that the present invention encompass such changes and modifications as fall within the scope of the appended claims.

What is claimed is:

1. A controller for controlling connections through two or more cross-connect networks, with at least one of said networks serving a plurality of different customers, each customer having one or more lines associated therewith and connected to said one network, said one network having a plurality of links for interconnecting said cross-connect network with another cross-connect network, said cross-connect networks each operable for establishing connections under control of said controller, for periods of time, from selected lines associated with selected ones of said customers to certain of said inter-network links;

said controller comprising:

means for receiving instructions from any of said customers;

means for monitoring the scheduled use of said inter-network links;

means controlled jointly by received instructions from one of said customers and by said monitoring means for reserving certain of said inter-work links for selected lines of said one customer for fixed determined periods of time;

means controlled by said reserving means for establishing through said cross-connect network connections from said one customer's selected lines to said reserved links at said designated period of time; and means for proving data pertaining to the length of time that any of said inter-network links are reserved by any particular customer.

2. The controller set forth in claim 1 further comprising:

means controlled by said reserving means for removing said established network connections to said reserved links upon receipt of a received instruction from said one customer; and means for indicating said removed established connection in said provided data.

3. The controller set forth in claim 2 wherein some of said links of said network are dedicated to certain of said customers and wherein certain of said links are pooled between said customers and wherein said reserved links are within said pool.

4. The controller set forth in claim 3 further comprising:

means for associating each of said customers with certain network link capacity; and wherein said reserving means includes:

means for checking said associating means to determine the validity of any customer instruction.

5. The controller set forth in claim 1 wherein said reserving means includes:

means enabled by a received instruction from a customer pertaining to a desired inter-network connection at a future period of time for identifying a proposed series of inter-network links which will be available during said period of time and which have not been reserved for use by any other customer; and means for storing said identified links until said designated period of time.

6. The controller set forth in claim 5 wherein said providing means includes:

means for reflecting the cost of each of said identified links in said provided data.

7. The controller set forth in claim 6 wherein said establishing means includes:

means operative at said designated reserved period of time for obtaining said stored identified links; and means for verifying the availability of said stored identified links.

8. The controller set forth in claim 7 wherein said establishing means further includes:
means operative upon a determination of non-availability of any of said links for establishing a new set of links for connection at said designated period of time.

9. The controller set forth in claim 8 wherein said determining means is operative at a period of time just prior to said designated period of time.

10. The controller set forth in claim 1 wherein said establishing means includes:
means for periodically checking to see if any internetwork connections are reserved for establishment during a next block of time;
means for initiating said link establishment for any reserved links prior to the actual reserved time; and
wherein said data providing means also provides data pertaining to the time of said actual link establishment said data including a starting time corresponding to the reserved period of time without regard to any early link establishment.

11. A network controller for use in a switched network having a plurality of nodes, each node having at least one remotely programmable cross-connect field, said nodes having communication links between them and at least some of said nodes having end user facilities connected to them, each said link containing one or more channels and wherein said end users can communicate over said links to and from a plurality of communication facilities connected to various ones of said nodes, and wherein each said cross-connect field is programmable to establish communication paths from selected facilities to selected channels of said links and from selected end users to selected channels of said links, said network controller comprising:
means for receiving instructions from said end users pertaining to facilities or other end users at certain of said nodes which are desired to be in a communicating relationship therewith during certain defined time periods, said instructions including the desired bandwidth capacity of each of said relationships;
means for preassigning channels of said links between the proper nodes for each said end user instruction on a first instruction received first preassigned basis, all for connection at said certain end users' defined period of time; and
means for providing cost accounting data pertaining to said preassigned channels, said data including the time of the preassignment and said end users' defined period of time.

12. The controller set forth in claim 11 further comprising:
means operative at each said defined period of time for establishing said preassigned desired communication relationships for each said end user using said preassigned channels.

13. The controller set forth in claim 12 further comprising:
means at each said defined period of time for ascertaining the continued availability or unavailability of said preassigned channels; and
means for changing said preassigned channels under control of said continued validity ascertaining means.

14. The controller set forth in claim 13 further comprising:
modifying means operative prior to said predetermined period of time with respect to any said end user for changing said preassigned channels; and
wherein said providing means for modifying said cost accounting data in accordance with said changed preassigned channels.

15. The controller set forth in claim 14 wherein said modifying means is operative in response to further instructions from said end user.

16. The controller set forth in claim 15 wherein said modifying means is further operative in response to said unavailability with respect to one or more of said preassigned channels.

17. The controller set forth in claim 14 wherein said preassigning means includes:
means for packing said channels of said links in an efficiently packed manner to utilize the full bandwidth capacity of each of said links, wherein the bandwidth of each said end user instructions utilizes contiguous channels of the same link.

18. The controller set forth in claim 11 further comprising:
means controlled by said reserving means for removing said established network connections to said reserved links at the expiration of said reserved period of time.

19. The controller set forth in claim 18 wherein said preassigning means includes:
means enabled by a received instruction from an end user pertaining to a desired inter-network connection at a future period of time for identifying a proposed series of inter-network links and channels thereof which will be available during said period of time and which have not been reserved for use by any other end user;
means for storing said identified channels of said identified links until said designated period of time; and
wherein said providing means includes means for including said identified series of links in said accounting information.

20. The controller set forth in claim 19 wherein said identifying means includes:
means for determining which link routing will be the most cost effective for said end user at said designated period of time.

21. A switched network having a plurality of nodes, each node having at least one remotely programmable cross-connect field, said nodes having communication links between them and at least some of said nodes having end user facilities connected to them, each said link containing one or more channels and wherein said end users can communicate over said links to and from a plurality of communication facilities connected to various ones of said nodes, and wherein each said cross connect field is programmable to establish communication paths from selected facilities to selected channels of said links and from selected end users to selected channels of said links, said network comprising:
means for receiving instructions from said end users pertaining to facilities or other end users at certain of said nodes which are desired to be in a communicating relationship therewith during certain defined time periods, said instructions including the desired bandwidth capacity of each of said relationships;

means for preassigning channels of said links between the proper nodes for each said end user instruction on a first instruction received first preassigned basis, all for connection at said certain end user defined period of time; and means for providing cost accounting data on an individual end user basis for each said preassigned channel.

22. The network set forth in claim 21 further comprising:

means operative at each said defined period of time for establishing said preassigned desired communication relationships for each said end user using said preassigned channels; and wherein said providing means includes means for providing data pertaining to said established desired communication relationships.

23. The network set forth in claim 22 further comprising:

means at each said defined period of time for ascertaining the continued validity of said preassigned channels; and modifying means for changing said preassigned channels under control of said continued validity ascertaining means.

24. The network set forth in claim 23 further comprising:

means operative prior to said predetermined period of time with respect to any said end user for changing said preassigned channels; and means operative in response to said modifying means for modifying said provided cost accounting information in accordance with said changed preassigned channels.

25. The network set forth in claim 24 wherein said modifying means is operative in response to further instructions from said end user.

26. The network set forth in claim 25 wherein said modifying means is further operative in response to ascertained problems with respect to one or more of said preassigned channels.

27. A method of billing for communication connections through a switched inter-nodal network, where the nodes have thereat a cross connect network for connecting end users to the inter-nodal communication links, said method comprising the steps of:

receiving instructions from each user of the network as to a desired communication bandwidth, desired destination points, and desired time period for the establishment of a communication connection through said switched network with respect to said end user;

storing the prospective information concerning which actual path will be established during said time period for said end user; and providing billing information for each end user cross connection on a connection by connection basis, said billing information including the time of the received instruction, the time of the actual availability of the connection through the network and the time of the disconnect of the cross connection.

28. The method set forth in claim 27 wherein said network includes a central administrator and wherein said method further includes the step of:

providing said billing information upon demand of any end user.

29. The method set forth in claim 27 wherein said network includes a central administrator and wherein said method further includes the step of:

providing said billing information upon demand of said network administrator.

30. A method of providing cost accounting in a controller for controlling connections through two or more cross-connect networks, with at least one of said networks serving a plurality of different customers, each customer having one or more lines associated therewith and connected to said one network, said one network having a plurality of links for interconnecting said cross-connect network with another cross-connect network, said cross-connect networks each operable for establishing connections under control of said controller, for periods of time, from selected lines associated with selected ones of said customers to certain of said inter-network links, the method comprising the steps of:

receiving instructions from any of said customers;

monitoring the scheduled use of said inter-network links;

reserving certain of said inter-network links for selected lines of said one customer for fixed determined periods of time, said reserving step controlled jointly by received instructions from one of said customers and by said monitoring step;

establishing through said cross-connect network connections from said one customer's selected lines to said reserved links at said designated period of time, said establishing step controlled by said reserving step; and providing said cost account data pertaining to the length of time that any of said inter-network links are reserved by any particular customer.

31. The method set forth in claim 30 further including the steps of:

removing said established network connections to said reserved links upon receipt of a received instruction from said one customer; and indicating said removed established connection in said provided data.

32. The method set forth in claim 30 wherein said reserving step includes the steps of:

identifying a proposed series of inter-network links which will be available during a period of time defined by a customer and which have not been reserved for use by any other customer;

storing said identified links until said designated period of time; and indicating the cost of each of said identified links in said provided data.

* * * * *

UNITED STATES PATENT AND TRADEMARK OFFICE
CERTIFICATE OF CORRECTION

PATENT NO.  :  5,065,393
DATED       :  November 12, 1991
INVENTOR(S) :  Sibbitt, et al.

It is certified that error appears in the above-identified patent and that said Letters Patent is hereby corrected as shown below:

Column 1, line 9, change "inter-network" to --internetwork--

Column 3, line 43, change "hour" to --hours--.

Column 6, line 58, delete "So" and change "by" to --By--.

Column 8, line 32, change "didn's" to --didn't--.

Column 10, line 18, change "inter-work" to --$_{\text{inter-network}}$--.

Claim 30, Column 14, line 39, change "account" to --accounting--.

Signed and Sealed this

Twenty-fifth Day of May, 1993

Attest:

MICHAEL K. KIRK

Attesting Officer

Acting Commissioner of Patents and Trademarks